United States Patent
Bodin et al.

(10) Patent No.: US 10,905,534 B1
(45) Date of Patent: Feb. 2, 2021

(54) ORAL CARE MOUTHPIECE WITH ORAL CARE ELEMENTS

(71) Applicant: Willo 32 SAS, Limoges (FR)

(72) Inventors: Antoine Michel Jean Bodin, Limoges (FR); Jean-Marie de Gentile, Paris (FR); Mihaela Popa, Limoges (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/748,550

(22) Filed: Jan. 21, 2020

(51) Int. Cl.
| | |
|---|---|
| *A61C 7/00* | (2006.01) |
| *A61C 17/02* | (2006.01) |
| *A46D 1/04* | (2006.01) |
| *A46B 9/04* | (2006.01) |
| *A46B 5/00* | (2006.01) |
| *A46B 11/00* | (2006.01) |
| *A46D 3/00* | (2006.01) |
| *B29C 45/16* | (2006.01) |
| *B29C 45/14* | (2006.01) |
| *B29C 45/00* | (2006.01) |
| *A46D 1/00* | (2006.01) |
| *B29L 31/42* | (2006.01) |
| *B29K 25/00* | (2006.01) |
| *B29K 83/00* | (2006.01) |

(52) U.S. Cl.
CPC ............ *A61C 17/0211* (2013.01); *A46B 5/00* (2013.01); *A46B 9/045* (2013.01); *A46B 11/0072* (2013.01); *A46D 1/0207* (2013.01); *A46D 1/04* (2013.01); *A46D 3/005* (2013.01); *B29C 45/0053* (2013.01); *B29C 45/0055* (2013.01); *B29C 45/14336* (2013.01); *B29C 45/1676* (2013.01); *A46B 2200/1066* (2013.01); *B29K 2025/08* (2013.01); *B29K 2083/00* (2013.01); *B29L 2031/425* (2013.01)

(58) Field of Classification Search
CPC ....... A61C 17/0211; A46B 5/00; A46B 9/045; A46B 11/0072; A46B 2200/1066; A46D 1/0207; A46D 1/04; A46D 3/005; B29C 45/0053; B29C 45/0055; B29C 45/14336; B29C 45/1676; B29K 2025/08; B29K 2028/00; B29L 2031/425
See application file for complete search history.

(56) References Cited

U.S. PATENT DOCUMENTS 6,893,259 B1 * 5/2005 Reizenson ......... A61C 17/0211
  433/29
9,636,197 B2    5/2017 Khangura
(Continued)

*Primary Examiner* — Shay Karls
(74) *Attorney, Agent, or Firm* — Daylight Law, P.C.

(57) ABSTRACT

This disclosure relates to oral care appliances and methods of forming oral care appliances. A disclosed oral care mouthpiece includes a flexible membrane and a set of oral care elements attached to the flexible membrane. The set of oral care elements have a composition with a hardness of at least 50 Shore Type A (shA). Each oral care elements in the set of oral care elements has a minimum stiffness value higher than $4\times10^{-8}$ newton meters and lower than $6\times10^{-3}$ newton meters. The stiffness value and hardness of the oral care elements are both critical values for the disclosed appliances and methods. The stiffness value can be expressed as the product of the Young modulus of the oral care element and the moment of inertia of the oral care element divided by the length of the oral care element.

46 Claims, 6 Drawing Sheets

(56) References Cited

U.S. PATENT DOCUMENTS

| | | |
|---|---|---|
| 9,913,992 B2 | 3/2018 | Demarest et al. |
| 2014/0093836 A1* | 4/2014 | Wolpo ................. A61N 1/0548 433/32 |
| 2014/0272761 A1* | 9/2014 | Lowe ..................... A61H 13/00 433/24 |
| 2017/0007383 A1 | 1/2017 | Blank et al. |
| 2017/0173354 A1 | 6/2017 | Demarest et al. |
| 2017/0367801 A1 | 12/2017 | Fitzgerald |
| 2018/0368957 A1 | 12/2018 | Hyun |
| 2019/0083216 A1 | 3/2019 | Blank et al. |
| 2019/0159877 A1 | 5/2019 | Sanders |

\* cited by examiner

ORAL CARE MOUTHPIECE WITH ORAL CARE ELEMENTS

BACKGROUND OF THE INVENTION

Dental cleaning plays a significant role in impacting the overall health of an individual. Many people schedule regular visits to a dentist for regular check-ups and cleaning operations. Many devices have been developed over the years to achieve the purpose of oral hygiene. These devices are either electrical or non-electrical. Among the above-mentioned categories of dental cleaning devices, electric dental units have gained popularity. Some examples of electric dental units are electric toothbrushes, dental water jets and electric flosses which intend to provide cleaning results by eradicating the food remains, plaque, etc from the spaces in between the teeth. These devices tend to require less user intervention in their operation and some are also suitable for people with reduced mobility or people on the move for whom it is difficult to use a traditional toothbrush. However, it is necessary to provide and improve existing dental units for ensuring satisfactory cleaning results.

SUMMARY OF THE INVENTION

Specific embodiments of the present invention disclosed herein relate to the technical field of oral care appliances and methods of use thereof. In particular, specific embodiments of the present invention disclosed herein relate to oral care appliances in the form of oral care mouthpieces with a base shaped to a dental arch and a set of oral care elements which apply pressure to the dental arch when the base elastically deforms in response to pressure variations in the mouthpiece. The oral care action of the mouthpiece can therefore be achieved via the application of pressure to the dental arch as caused by these pressure variations.

The oral care mouthpiece may be used for cleaning, polishing, whitening, halitosis abatement, and in other general oral care applications. The oral care elements on the oral care mouthpiece can be optimized for one of these applications or be generally applicable to multiple applications. The oral care elements could be brushing elements used for cleaning, mildly abrasive elements used for polishing, coated elements for applying a chemical treatment, or any other kind of oral care elements that produce an oral care action when actuated relative to the dental arch.

In specific applications, the mouthpiece may include oral care agents that are either applied prior to the oral care action or injected into the mouthpiece during the oral care action. The oral care agent could be: a polishing agent such as an inert abrasive; a cleaning agent such as fluoride, activated charcoal, or a fluoride-fee antibacterial composition; a halitosis treatment agent such as chlorine dioxide; or a whitening agent such as hydrogen peroxide. The active composition could also be any mixture of these kinds of agents and chemicals. The oral care elements can be optimized for the application of these oral care agents to the dental arch of the user.

In specific embodiments of the invention, the mouthpiece can achieve an oral care action via elastic deformation of the mouthpiece. The mouthpiece can include a flexible membrane that elastically deforms to achieve this objective. The deformation of the mouthpiece can be achieved through the creation of pressure variations in the mouthpiece. The pressure variations can be created in a chamber formed between the mouthpiece and the dental arch of the user. The chamber can be formed naturally by the device as the mouthpiece can be shaped to the dental arch and configured to form a seal against the gingiva of the dental arch. The pressure variations can be created by a separate system such as a liquid or gaseous pump. In specific embodiments of the invention in which oral care agents are injected and removed from the mouthpiece automatically, the same pressure variations can be used for the dual purpose of creating the oral care action and cycling the oral care agents and waste through the mouthpiece.

In specific embodiments of the invention, the oral care elements need to be stiff (e.g., in order to disrupt dental plaque on the dental arch). However, as mentioned previously, in specific embodiments the mouthpiece may need to be flexible and elastic and may need an irregular shape in order to fit the dental arch of a user. In specific embodiments, these requirements conflict and present a design challenge as the oral care elements must be sufficiently stiff and hard, but at the same time must not limit the flexibility or general shape of the mouthpiece. For example, oral care elements in the form of dental nylon bristles are generally mounted on a flat brush head and would be difficult to attach without decreasing the flexibility of a flexible mouthpiece. However, utilizing specific approaches disclosed herein the objective of a superior oral care action provided by a flexible membrane can be matched with oral care elements having sufficient stiffness and hardness.

In specific embodiments of the invention, methods are applied to allow a moulded set of oral care elements to be formed. The moulded oral care elements can be applied to the contours of a shaped mouthpiece and do not limit the flexibility thereof. Specific methods for forming and/or applying the moulded oral care elements to a shaped mouthpiece are disclosed below.

In specific embodiments of the invention, particular ranges of stiffness and hardness values for the oral care elements are targeted for the above-mentioned purposes (e.g., providing sufficient oral care action against the dental arch while allowing the mouthpiece to remain flexible). In particular, the applicants have found a critical value of stiffness and hardness for the oral care elements in the range of $4 \times 10^{-8}$ Newton-meters (Nm) to $6 \times 10^{-3}$ Nm with a hardness of at least 50 Shore Type A (shA). As used herein, the phrase "a hardness of at least 50 shA" includes materials with a hardness that is beyond the shA scale (e.g., materials whose hardnesses are measured using the Shore Type D protocol). As used herein, the stiffness value of an oral care element is measured from an axis perpendicular to a minimum cross section of the oral care element. The stated minimum stiffness provides enough stiffness to perform an oral care action when placed on a flexible and deformable membrane. The stated maximum stiffness provides enough deformation of the brushing element to perform an oral care action on the teeth in the particular configuration of an oral care element attached to a flexible membrane. These values are generally applicable to oral care elements used along with a flexible mouthpiece providing an oral care action via the deformation of the mouthpiece (e.g., through contraction and de-contraction cycles). Furthermore, the values are particularly applicable to moulded oral care elements which require a larger stiffness value for a sufficient oral care action owing to a decrease in density afforded by moulding processes as opposed to alternative processes (e.g., a density of lower than 10 elements per square millimetre).

In specific embodiments of the invention, an oral care mouthpiece is provided. The oral care mouthpiece comprises a flexible membrane and a set of oral care elements: (i) attached to the flexible membrane; and (ii) having an oral care element composition. Each oral care element in the set of oral care elements has a minimum stiffness value higher than $4\times10^{-8}$ Nm and lower than $6\times10^{-3}$ Nm. The oral care element composition has a hardness of at least 50 shA.

In specific embodiments of the invention, a method of forming an oral care mouthpiece is provided. A method of forming an oral care mouthpiece comprises forming a flexible membrane and forming a set of oral care elements: (i) attached to the flexible membrane; and (ii) having an oral care element composition. Each oral care element in the set of oral care elements has a minimum stiffness value higher than $4\times10^{-8}$ Nm and lower than $6\times10^{-3}$ Nm. The oral care element composition has a hardness of at least 50 shA.

In specific embodiments of the invention, an oral care mouthpiece is provided. The oral care mouthpiece comprises a flexible membrane and a set of oral care elements: (i) attached to the flexible membrane; and (ii) having an oral care element composition. The oral care element in the set of oral care elements has a stiffness value higher than $4\times10^{-8}$ Nm and lower than $6\times10^{-3}$ Nm. The stiffness value is measured from an axis perpendicular to a minimum cross section of the oral care element. The oral care element composition has a hardness of at least 50 shA.

DETAILED DESCRIPTION OF THE PREFERRED EMBODIMENT

Figure 1:
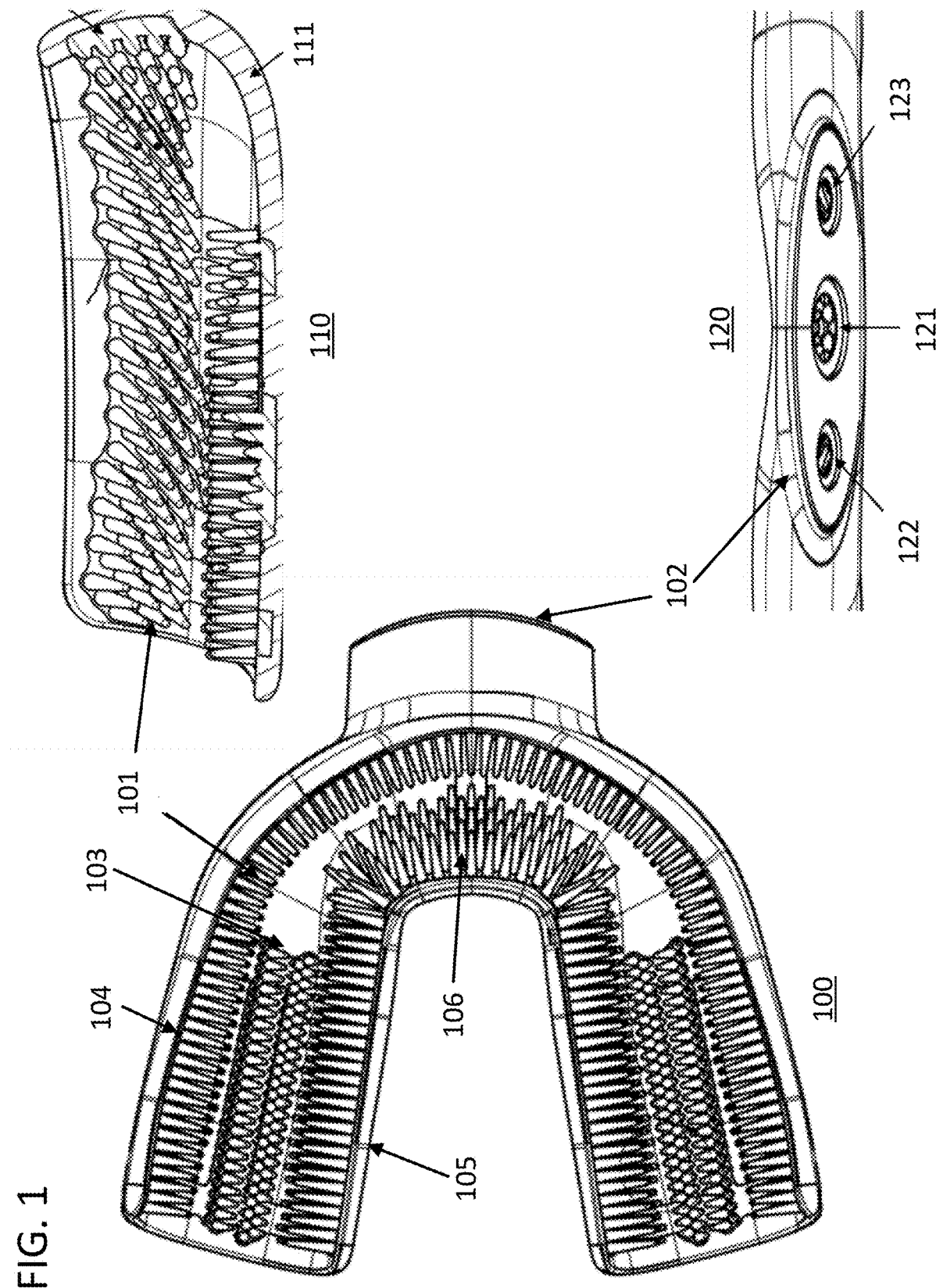
FIG. 1 illustrates a top down, front, and cross-sectional view of an oral care mouthpiece in accordance with specific embodiments of the present invention.

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

Aspects of specific embodiments of the present invention will be presented by describing various embodiments using specific examples and represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

In specific embodiments of the invention, an oral care mouthpiece is provided as formed by a flexible membrane and a set of attached oral care elements. The oral care mouthpiece can be configured to deform in order to create an oral care action between the oral care elements and the dental arch of a user. The oral care elements in the set of oral care elements can have a minimum stiffness value higher than $4\times10^{-8}$ Nm and lower than $6\times10^{-3}$ Nm. The oral care element composition of the set of oral care elements can have a hardness of at least 50 sHA (including any of its equivalents in other Shore scales such as Shore Type D (shD)). In specific embodiments of the invention, the oral care elements are moulded and have a density of less than 10 elements per square millimetre.

In specific embodiments of the invention, the flexible membrane and the oral care elements can have various compositions. For example, the flexible membrane and/or oral care element compositions can include rubber, plastic, silicon, latex, polymers, or thermoplastic elastomers (TPE). The flexible membrane composition can also be any soft and flexible material suitable for oral care. The oral care element compositions can also be any other materials including those having the hardness mentioned above. The compositions of both the oral care elements and the flexible membrane can be biocompatible. In specific embodiments of the invention, the oral care elements and/or the flexible membrane will have a base composition which is then modified using an additional processing step. The additional processing step can modify the composition of the entire oral care elements or instead only produce a separate surface composition. The base composition of the oral care elements and/or the membrane can be modified using a chemical or mechanical modification to provide properties such as enhanced friction with dental plaque, antibacterial properties, enhanced visual appearance such as colour changes or other optical effects, and other desired properties.

In specific embodiments of the invention in which the oral care mouthpiece includes a flexible membrane, the flexible membrane composition can be a TPE material. TPEs are suitable as flexible materials for oral care applications. They are copolymers consisting essentially of a physical mix of polymers having plastic and elastomeric properties. Furthermore, they have a suitable temperature range of operation, between $-10°$ C. and $80°$ C. They can have good food and medical grade properties as well as an absence of significant creep. Furthermore, they have good tearing and tensile strength. These properties make TPEs suitable for constituting the flexible material of the membrane.

In specific embodiments of the invention in which the oral care mouthpiece includes a flexible membrane, the flexible membrane composition can be a silicone material. Silicones are suitable as flexible materials for oral care applications. They have a suitable temperature range of operation, between $-55°$ C. and $300°$ C. They can have good food and medical grade properties as well as an absence of significant creep. Furthermore, they have good tearing and tensile strength. These properties make silicones suitable for constituting the flexible material of the membrane.

In specific embodiments of the invention, the flexible membrane composition and/or the oral care element composition are thermo-plastic elastomers with styrenic block copolymers (TPE-S) such as Styrene Ethylene Butylene Styrene (SEBS) or Styrene-Butadiene-Styrene (SBS). TPE-S material provides an effective range of hardness for a device using a flexible membrane to clean teeth (e.g., 18 shA to 90 shA). TPE-S materials can also be used in co-injection or over-moulding processes which provides solid attachment of the flexible membrane composition and oral care elements in approaches in which both components of a mouthpiece are formed using a moulding process. Furthermore, TPE-S materials have good biocompatibility properties and are thus suitable to be used in a product that enters in contact with body fluids or mucosa.

In specific embodiments of the invention, the flexible membrane and the oral care elements can have different compositions while in alternative embodiments they have a shared composition. For example, the flexible membrane and the oral care elements may be formed by the same material, while the oral care elements are subjected to a further treatment which increases the stiffness of the material while leaving the membrane flexible. In these examples the two components would have a shared composition in the form of the original material. In another example, the flexible membrane and oral care elements have different compositions when formed and are bonded using over-moulding, co-injection moulding, adhesives, fusing, sonic welding, staples, screws, snaps, or any other method of attaching different components. Embodiments in which both the flexible membrane and the oral care elements have a shared composition and are formed via moulding exhibit certain benefits in that such approaches offer good chemical compatibility and thus good adhesion between parts of different stiffness.

The oral care elements used in accordance with specific embodiments of the invention can have various configurations and compositions to target the range of stiffness and hardness mentioned above. The oral care elements can include a set of bristles or other textures depending upon the density and characteristics of the elements. The shape of the oral care elements can be conical, cylindrical, flat, pointed tip, tapered, star-shaped, zig-zag, or any other shape which can confer the appropriate stiffness value and behaviour under the membrane deformation. The oral care elements can be arranged in different angular arrangements in the mouthpiece to provide effective cleaning around and in between the dental arch. In specific embodiments of the invention, in which the oral care elements are formed using a moulding process, the oral care elements have an orientation of less than 45 degrees from a demoulding axis of the oral care mouthpiece to assure that they are not damaged during demoulding. The oral care elements can be configured to define one or more brushing planes in the mouthpiece. The brushing planes can be aligned with a main surface of the dental arch. For example, a brushing plane could be aligned with the outer surfaces of the right side of the top dental arch. The mouthpiece could include enough brushing planes so that each main surface of the portion of the dental arch that was within the ambit of the mouthpiece included its own brushing plane. In specific embodiments, the oral care mouthpiece includes at least one brushing plane below the dental arch and at least two brushing planes aside the dental arch (e.g., on an outer surface and an inner surface).

The membrane used in accordance with specific embodiments of the invention can have various configurations and compositions. The membrane can be made of a flexible material (e.g., having a hardness ranging between 5 shA and 80 shA). The membrane can be formed of plastic, silicon, TPE, latex, or nylon. The membrane can have a low stiffness (e.g., thin walls with local specificities such as a bumper on the edges and/or be entirely comprised of soft material) to ensure: deformability under low pressure variations; uniform deformability; sufficient sealing with the user's gums; protection of the user's soft tissues; adaptability to several arch geometries; and sufficient sealing with any connecting component. The membrane can be biocompatible, supple, and elastic. The membrane can be configured to go back to its original shape if the pressure applied on all of its surfaces stays under a recommended threshold. In specific embodiments of the invention, the flexible membrane will have an elasticity modulus of 1 MPa to 20 MPa. Furthermore, the material deformation inertia should be weak. In specific embodiments of the invention, oral care elements on the flexible membrane can have an elasticity modulus of 1 MPa to 5 GPa.

In specific embodiments of the invention, the mouthpiece can take on various shapes. The mouthpiece could be shaped to cover at least a portion of the gingiva of the user's mouth and allow the oral care elements on the mouthpiece to lie in proximity to the teeth. The base can be shaped to a dental arch in that it covers a single full arch of a user's teeth (e.g., the top or the bottom). The mouthpiece can be in a form of denture shape or a U-shaped mouthpiece. The mouthpiece may be made-up of soft material which is moulded/pre-shaped in a curved shape forming an arch, u-shape, c-shape, horseshoe shape, or any other shape allowing easy insertion of the mouthpiece around the dental arch of the user. In specific embodiments of the invention, the mouthpiece can be shaped to contact the gums of the user, providing comfort and good hermeticity to a cavity formed by the mouthpiece and the dental arch. The mouthpiece can be configured to deform uniformly and seal with the dental arch. The cavity can be the cavity mentioned elsewhere herein which is used to cycle the mouthpiece between a contracted and de-contracted phase by altering the pressure between the inside and the outside of the membrane.

The mouthpiece could be part of a set in which one part of the set was shaped to the top dental arch of a user while the second part of the set was shaped to the bottom dental arch of the user. Alternatively, the mouthpiece could be reversible and could be applied to both the top and bottom arches at different times. The mouthpiece could be part of a set in which one part of the set was shaped for each quarter of the dental arch of a user, while the other three parts of the set were shaped for the remaining portions of the dental arch of the user. The mouthpiece could be part of a set in which one part of the set was shaped for counter quarters of the dental arch of a user, while a second part of the set was shaped for the alternative two counter quarters of the dental arch of the user. Alternatively, the mouthpiece could be reversible and rotatable such that it could be applied to the four different quarters of the dental arch at different times. The mouthpiece could also be a single element capable of covering both the top and bottom dental arch of the user at a single time.

FIG. 1 illustrates a top down 100, cross-sectional 110, and front 120 view of an oral care mouthpiece in accordance with specific embodiments of the present invention. Cross-sectional view 110 shows an exposed cross section of flexible membrane 111 along with a set of oral care elements 101. The set of oral care elements 101 are attached to the flexible membrane 111 and have an oral care element composition (e.g., S-TPE). The oral care elements define a brushing plane 103 below the dental arch and two brushing planes 104 and 105 aside the dental arch. Additional brushing planes defined by the oral care elements are discernible from the drawing without being individually referenced. The flexible membrane 111 is shaped to the dental arch and can elastically deform in response to pressure variations in the mouthpiece. The term elastic is used herein to refer to a property of a material which allows it to deform in response to an applied force and then return to its original shape when that force is removed. The flexible membrane can have a flexible membrane composition (e.g., TPE). In the illustrated case, the pressure variations can be caused in a chamber formed by membrane 111 pressing against the dental arch. The mouthpiece also includes a set of oral care elements 106 that contact both the back and bottom surface of the front of the dental arch by wrapping under the dental arch in response to pressure variations in the mouthpiece.

In specific embodiments of the invention, the mouthpiece may include oral care agents that are injected into the mouthpiece during the oral care action by conduits formed in the mouthpiece. The conduits can be holes that connect an exterior of the mouthpiece to an interior of the mouthpiece. In embodiments in which the mouthpiece elastically deforms in response to pressure variations in a chamber, the conduits can connect to the chamber to assist in the creation of these pressure variations. The conduits can be used to draw liquids or gases out of the chamber and inject gases and or liquids into the chamber in order to do so. The gases or liquids that are injected into or pulled from the chamber can move in response to the action of a liquid or gaseous pump coupled to the conduits. The mouthpiece can include separate conduits for moving liquids or gases into the mouthpiece and for removing liquids or gases from the mouthpiece. The separate conduits can have different configurations relative to each other. For example, the membrane can include at least one lateral orifice for injecting liquid oral care agents (e.g., toothpaste) or gases (e.g., air) into the mouthpiece, and one or more central orifices for removing air, oral care agents, and any possible waste or excess saliva from the oral care mouthpiece.

In specific embodiments of the invention, the mouthpiece can include a flexible port which provides a connection interface from the mouthpiece to a liquid or gaseous pump. The port can be a flexible insertion port. The port can surround the conduits mentioned in the prior paragraph and be configured to form a seal around the external portions thereof when connected to a counterpart component such as a tether to a pumping system or a handle for the oral care appliance to which the oral care mouthpiece forms a part. In specific embodiments of the invention in which oral care agents are injected and removed from the mouthpiece automatically, the same pressure variations can be used for the dual purposes of creating the oral care action and cycling the oral care agents and waste through the mouthpiece using these conduits and the part that is connected to the flexible port.

Front view 120 in FIG. 1 illustrates a flexible insertion port 102 on a front portion of the oral care mouthpiece. The flexible insertion port 102 is formed in the flexible membrane 111. Front view 120 also shows two liquid injection orifices 122 and 123 in flexible membrane 111. The orifices extend from the exterior of the mouthpiece to the interior of the mouthpiece. Front view 120 also shows a drainage orifice 121 in flexible membrane 111. The orifice extends from the interior of the mouthpiece to the exterior of the mouthpiece. As illustrated, the flexible insertion port 102 surrounds the liquid injection orifices 122 and 123 and the drainage orifice 121. The drainage orifice 121 is centrally located along the mouthpiece to minimize the maximum distance waste would need to travel before draining. As illustrated, the liquid injection orifices 122 and 123 bracket the drainage orifice 121. A separate component could connect to and form an airtight seal with each of the orifices and the flexible insertion port could provide additional mechanical strength to the seal.

Figure 2:
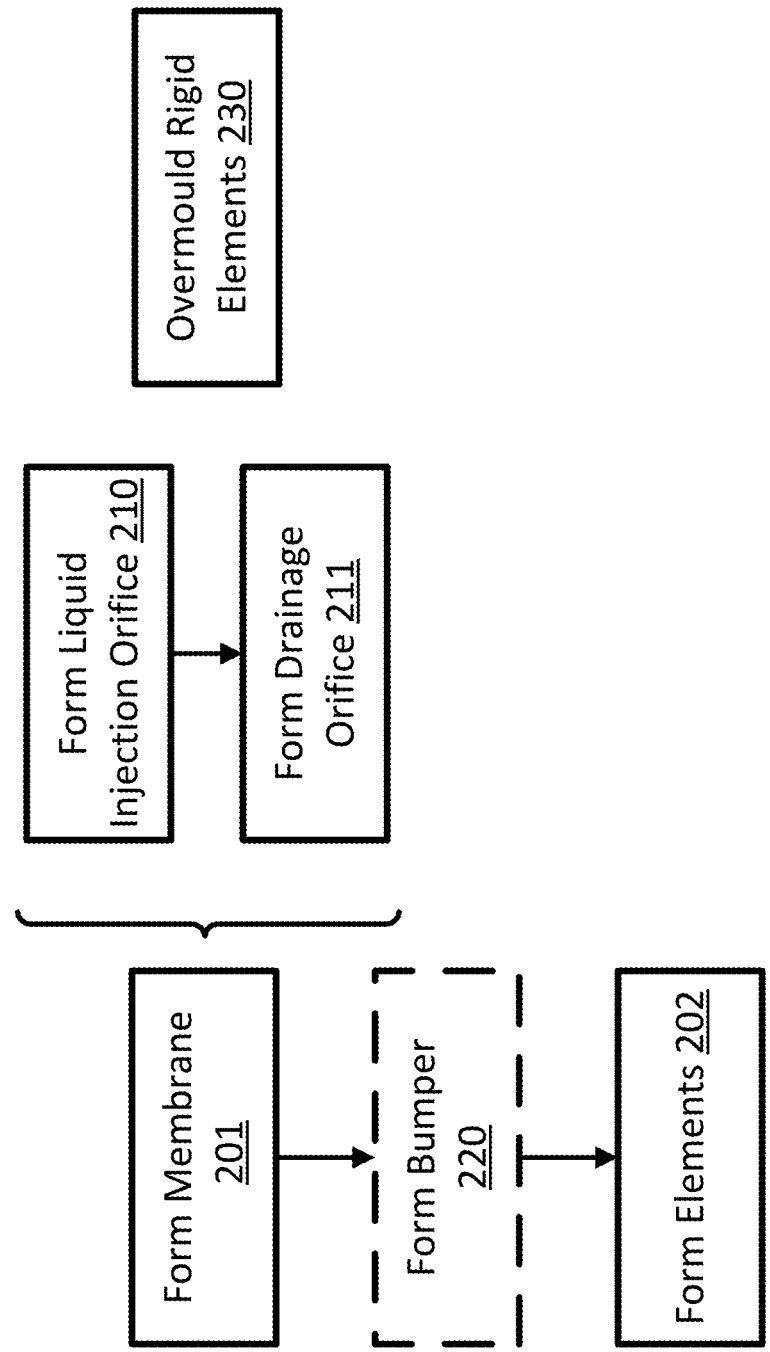
FIG. 2 illustrates a flow chart for a set of methods of forming an oral care mouthpiece in accordance with specific embodiments of the present invention.

FIG. 2 illustrates a flow chart 200 for a set of methods of forming an oral care mouthpiece in accordance with specific embodiments of the present invention. Flow chart 200 includes a step 201 of forming a flexible membrane followed by a step 202 of forming a set of oral care elements. The oral care elements are attached to the flexible membrane and have an oral care element composition. Step 202 can be involve a separate step of forming the oral care elements followed by attaching them to the membrane, or can involve a single step, such as via an over-moulding or co-injection moulding, in which the oral care elements are formed directly on the membrane. Specific approaches for executing these steps are described below. Using the approaches disclosed herein, each oral care element in the set of oral care elements formed in step 202 can have a minimum stiffness value higher than $4 \times 10^{-8}$ Nm and lower than $6 \times 10^{-3}$ Nm and the oral care element composition can have a can have a Shore Type A hardness of at least 50 sHA or any of its equivalents in other Shore scales such as Shore Type D (shD).

Flow chart 200 also includes steps 210 and 211 which are executed in specific embodiments of the invention represented by flow chart 200. Step 210 includes forming liquid injection orifices from the exterior of the mouthpiece to the interior of the mouthpiece. Step 211 includes forming a drainage orifice from the interior of the mouthpiece to the exterior of the mouthpiece. Any number of orifices can be formed in either step. For example, step 210 can include forming two liquid injection orifices such as 122 and 123 in FIG. 1. Steps 210 and 211 can be conducted simultaneously with the remainder of step 201 if the conduits form part of the mould used to produce the membrane, or can be conducted as a separate step involving the removal of membrane material after the core of the membrane has been formed.

Figure 3:
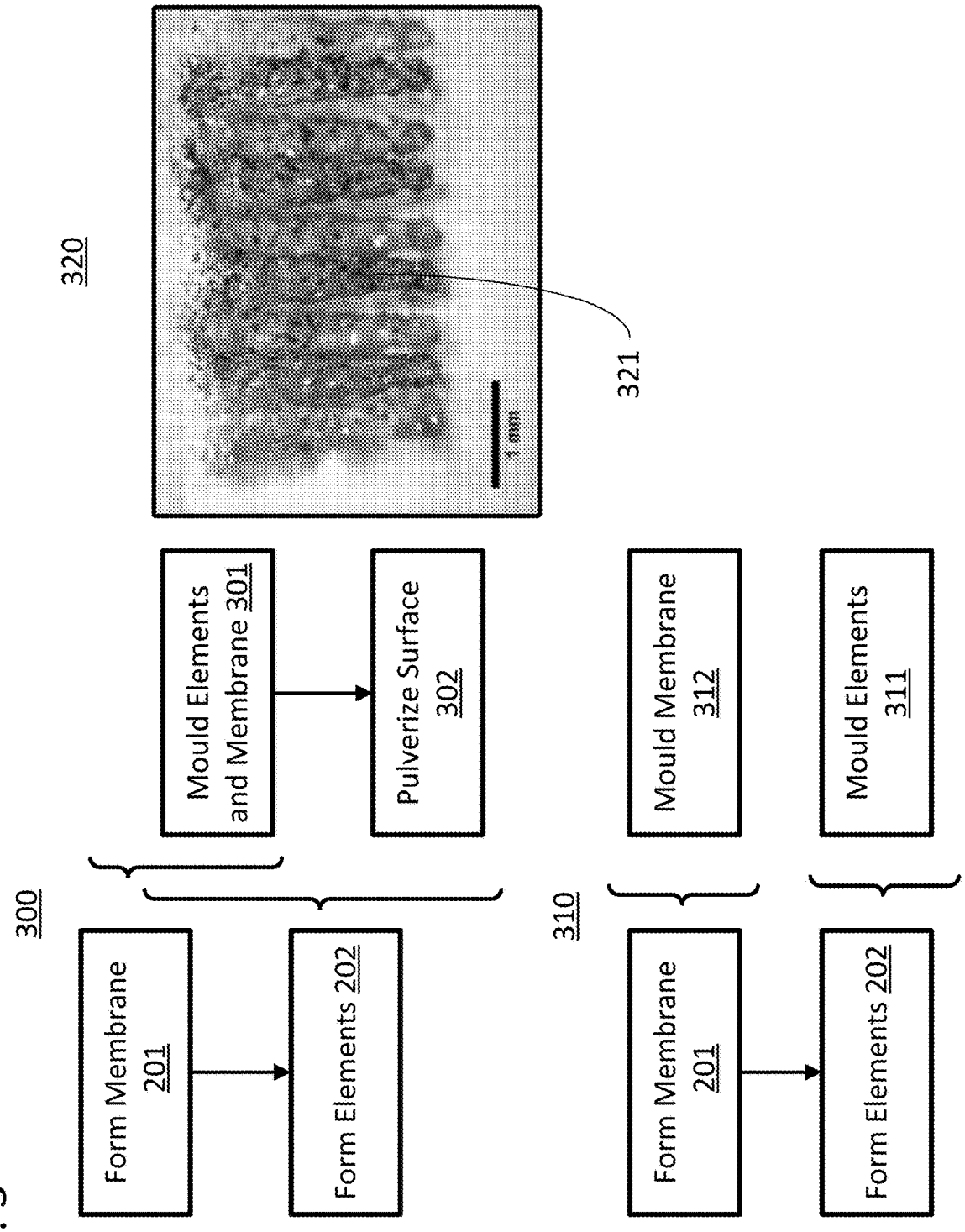
FIG. 3 illustrates an oral care element and two flow charts for two sets of methods of forming an oral care mouthpiece in accordance with specific embodiments of the present invention.

FIG. 3 illustrates a set of oral care elements 320 and two flow charts 300 and 310 for two sets of methods of forming an oral care mouthpiece in accordance with specific embodiments of the present invention. Flow charts 300 and 310 differ in the manner in which the oral care elements are formed such as in step 202 described above. Flow chart 300 involves transforming a base composition of the oral care elements using an additional processing step after they have initially been formed. Flow chart 310 involves moulding the oral care elements using a different composition. In both approaches, the oral care elements are formed by moulding and, if the composition of the oral care elements and membrane are sufficiently curated, can exhibit the benefits mentioned above in terms of solid adhesion between the membrane and oral care elements while still allowing the flexible membrane to remain elastic and the oral care elements to exhibit the critical stiffness and hardness values described herein.

In specific embodiments of the invention, an oral care mouthpiece includes a flexible membrane with oral care elements having the same composition formed thereon, while an additional processing step is conducted on the mouthpiece that solely affects the oral care elements and thereby increases the stiffness of the oral care elements while the membrane remains flexible. For example, once a co-moulded set of oral care elements was demoulded the oral care elements could be modified using a mechanical, chemical, or electrochemical surface treatment. This two steps process (i.e., moulding followed by additional processes such as coating) may be conducted rapidly thus increasing the speed of mouthpiece production. The additional processing step could involve pulverizing the oral care elements with abrasive particles, chemical deposition of material onto the oral care elements, targeted sonic or heat treatments directed at the oral care elements, and any other targeted processing step including those which involve placing a mask on balance of the membrane material to shield it from processing.

Flow chart 300 includes an implementation of step 202 which involves moulding the set of oral care elements with the flexible membrane using a flexible membrane composition in a step 301. As the oral care elements are either over-moulded or co-injection moulded with the membrane in this approach, flow chart 300 illustrates step 301 as being an implementation of both steps 201 and 202. Flow chart 300 continues with a step 302 of pulverizing a surface of the set of oral care elements using a mixed solution. In specific embodiments of the invention that utilize a mixed solution to pulverize a surface of the oral care elements, the mixed solution can include abrasive particles in diluted silicone. These processes would modify the oral care elements by hardening them and reducing their contact areas to the stiff edges of the particles (thus increasing the pressure applied locally). In specific embodiments of the invention in accordance with flow chart 300, the mixed solution can form an outer layer of abrasive particles on the oral care elements.

In specific embodiments of the invention in which the oral care mouthpiece is formed by moulding the oral care elements using the same material as the membrane followed by applying abrasive particles, the resulting oral care mouthpiece can include a flexible membrane having a flexible membrane composition and an oral care element with an oral care element composition that is a core of the flexible membrane composition and a surface layer of abrasive particles. The surface layer of abrasive particles could be irregular and include a set of gaps. Picture 320 is a magnified view of a set of oral care elements that have been formed using an approach in accordance with flow chart 300. The illustrated oral care elements are formed of silicon while the mixed solution used in the implementation of step 302 was diluted silicon with abrasive particles (e.g., hydrated silica). The outer layer of abrasive particles 321 are irregular and include a set of gaps. As shown, the gaps in the set of gaps are all smaller than one milli-meter.

In specific embodiments of the invention, the membrane and the oral care elements are both moulded elements, but they are moulded with different compositions. To provide reliable adhesion, the oral care elements composition can have a same type of composition as the flexible membrane composition but have a higher hardness and/or a larger stiffness than the flexible membrane composition. In specific embodiments of the invention, the oral care elements can be one of an over-moulded structure formed on the flexible membrane and a co-injected structure formed on the flexible membrane. For example, flow chart 310 includes a first step 312 of moulding the membrane of the oral care mouthpiece and a second step 311 of moulding the oral care elements. The second step can be conducted using an over-moulding step or a co-injection step in which the composition of the injection is modified between the execution of step 312 and 311. In the case of co-injection, the different compositions for the oral care elements and the flexible membrane can be injected into the same mould.

In specific embodiments of the invention, a step of forming oral care elements on a membrane, such as step 311, can include over-moulding with a material having a separate composition than the membrane. For example, a membrane of the mouthpiece could be moulded in a 20 shA silicon and include a simple curved surface. Once the membrane is injected, the oral care elements can be over-moulded in a stiffer 60 sh A silicon. In these embodiments, the two silicones are fused at the base of the oral care elements and the oral care elements are strongly attached to the membrane. This process can be used for a wide array of mouldable materials including TPE and the others mouldable materials mentioned herein.

In specific embodiments of the invention, a step of forming oral care elements on a membrane can include modifying the mechanical and chemical properties of the oral care elements by injecting particular particles during the injection or by modifying the injection parameters to create a properties gradient. A properties gradient refers to the oral care elements and the membrane being made of the same material but with different properties (stiffness, composition, surfaces state) with characteristics that change at a stable or variant rate along a path drawn through the oral care mouthpiece. Furthermore, for moldable material, it is possible to modify the mould texture on specific areas thus modifying the surface of the part. By doing so it is possible to improve the oral care element efficacy by enhancing their contact interaction with the dental arch, thus boosting the oral care action of the oral care elements in certain embodiments.

The geometry of the oral care elements can be selected from a wide array of alternatives. Both the shape of the individual elements and the pattern in which the elements are configured can be curated to maximize the oral care performance of the mouthpiece. Furthermore, the oral care elements can be configured to enhance the stiffness of the oral care elements relative to the mouthpieces. These embodiments are particularly beneficial when similar materials are being used for the mouthpiece and oral care elements. The oral care element stiffness can be modified in various ways. For example, the geometry of the oral care elements can be adapted (e.g., thicker and shorter bristles increase stiffness), a rib can be added, or the oral care elements may be oriented in a particular direction to ease deformation toward a particular area of the teeth or gums. A particular geometry and distribution of oral care elements can enhance both the oral care capability of the mouthpiece and increase the area reached by the oral care elements on the dental arch.

Figure 4:
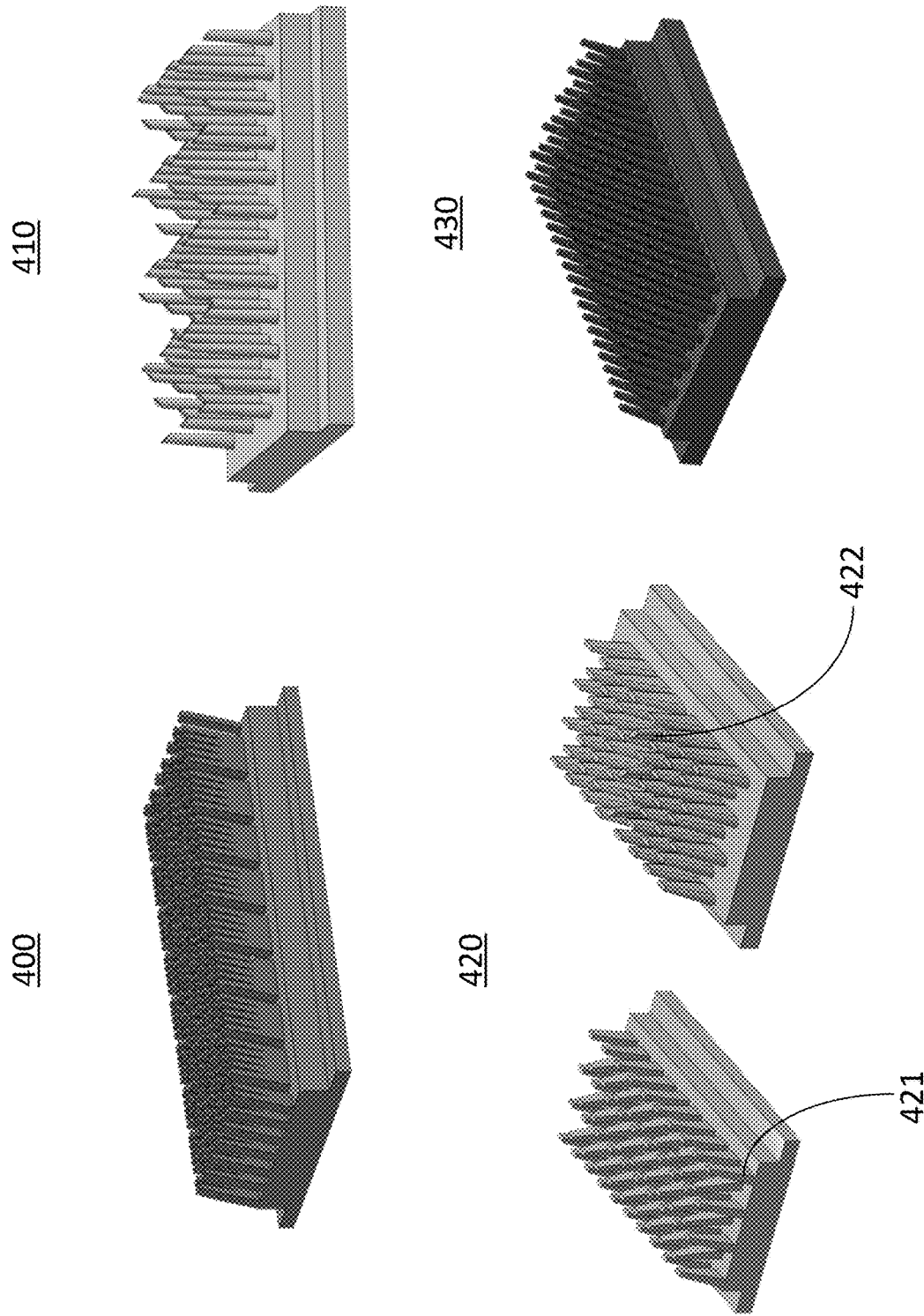
FIG. 4 illustrates various configurations of oral care elements that are in accordance with specific embodiments of the present invention.

FIG. 4 illustrates various configurations of oral care elements that are in accordance with specific embodiments of the present invention. All of the sets shown in FIG. 4 can be produced using a moulding process as the oral care elements each have their heights aligned less than 45 degrees off the demoulding axis of the set of elements. Illustration 400 shows a set of oral care elements in an invariant pattern in which multiple oral care elements share a larger base element. The design is beneficial in that the common base increases the stiffness of the elements while the thinner ends provide for increased contact with the dental arch. Furthermore, such a shape prevents the detachment of the brushing elements during the demoulding process. If the angle of the oral care elements is also aligned with the direction at which the elements will be applied to the teeth the stiffness of the oral care elements will likewise be increased. Illustration 430 shows a similar arrangement of oral care elements where the element exhibits a uniform cross section across its entire length. Illustration 410 shows a set of oral care elements with different heights to increase the variety of oral care interactions with the dental arch. Illustration 420 shows two sets of oral care elements with different ranges of variance in their patterns. Pattern 421 includes alternating relative angles on a row-by-row basis which provides enhanced stiffness for at least half the elements regardless of which of the two main directions an oral care action can be effectuated by the set. Patten 422 has a longer range variation and is provided to locally increase the stiffness of the set of oral care elements.

In specific embodiments of the invention, oral care elements formed on membranes having the characteristics described above can be shaped to provide the critical level of stiffness described herein. For example, the oral care elements could be: longer than 3 mm and shorter than 10 mm; have a minimum cross section, measured at a midpoint of the length of the oral care elements, greater than 0.1 mm; and have an average cross section, measured at the midpoint of the length of the oral care elements, lower than 0.5 mm. For the types of materials disclosed herein as being used to form oral care elements, oral care elements having these values have likewise been found to be critical for providing a significantly enhanced oral care action, such as better dental plaque removal, better oral care elements coverage, more homogeneous oral care solution application, better teeth surface exposition to whitening actions, and better mechanical action toward the gums with the oral care elements while allowing the membrane to remain sufficiently flexible.

In specific embodiments of the invention, the oral care elements have the following characteristics. They are made of a stiff yet flexible material with a hardness of at least 50 shA such as but not limited to TPE, latex, silicone, Nylon, TP, or PolyPropylene. The combination of the geometry, density (i.e., number of bristles per $cm^2$) and material of the brushing elements allows the oral care elements to change shape to remove plaque on the surface of the teeth. The combination of the geometry, density, number of bristles covering the membrane, and material of the brushing elements allows good contact/interference properties with the surface of the teeth so that the bristles are sliding, rubbing, scrubbing, creating various local pressure conditions.

In specific embodiments of the invention, the oral care elements have a three-dimensional shape of a cylinder or a cone. More generally the oral care elements have any two-dimensional section extended over a longer dimension by an average length L. The section of the oral care element may be any two-dimensional shape, such as a disk, triangle or square. The section of the oral care element may be regular or irregular. The average quadratic moment (also known as moment of inertia) of a section of the bristle is referenced as I (in $m^4$ units). The Young modulus of the material is referenced as E (in Pa or Pascal). The Young modulus is a measure of deformation. A stiffness S of the brushing element is defined as $S=E \times I/L$ (in Nm, as $1 Pa=1 N/m^2$). The higher the value of S, the higher the stiffness of the brushing element. In specific embodiments of the invention, the Young modulus is advantageously lower than 500 M Pa (mega Pa).

In specific embodiments of the invention, the oral care mouthpiece can have local specificity in order to protect the soft tissues (e.g., gums, tongue, cheeks) of the user. As mentioned previously, the membrane of the oral care mouthpiece can have a different composition than the oral care mouthpiece. In such embodiments, the membrane could be made softer than the oral care elements in order to enhance the comfort of the user. As another example, the oral care mouthpiece might present particular and local characteristics to improve the comfort of the user. One of these local characteristics could be a bumper with a different composition (e.g., softer) than the remainder of base in order to form a comfortable seal with the dental arch.

In specific embodiments of the invention, the oral care mouthpiece can have a local characteristic in the form of a bumper located on an edge of the oral care mouthpiece. The bumper can be formed to contact the dental arch of the user. The bumper can have a bumper composition. The bumper composition can have a lower hardness than the membrane composition.

The local characteristics can be formed via over-moulding or, if the base is also formed by moulding, by co-injection moulding. FIG. 2 includes an optional step 220 of forming a local characteristic in the form of a bumper. Step 220 can include forming a bumper on an edge of the oral care mouthpiece. The bumper can be formed to contact the dental arch and have a bumper composition. The bumper composition can have a lower hardness than the membrane composition. This can be achieved by using different core materials for steps 201 and 220, or using the same material and conducting an additional treatment on the bumper area in step 220. The manner of execution of step 220 can depend on the manner in which step 201 was executed. For example, steps 201 and 220 can be executed using the same mould in a co-injection process. Alternatively, step 201 can be executed and the membrane can be fully formed before the bumper is formed and attached in an execution of step 220 that includes an adhesive or bonding step.

Figure 5:
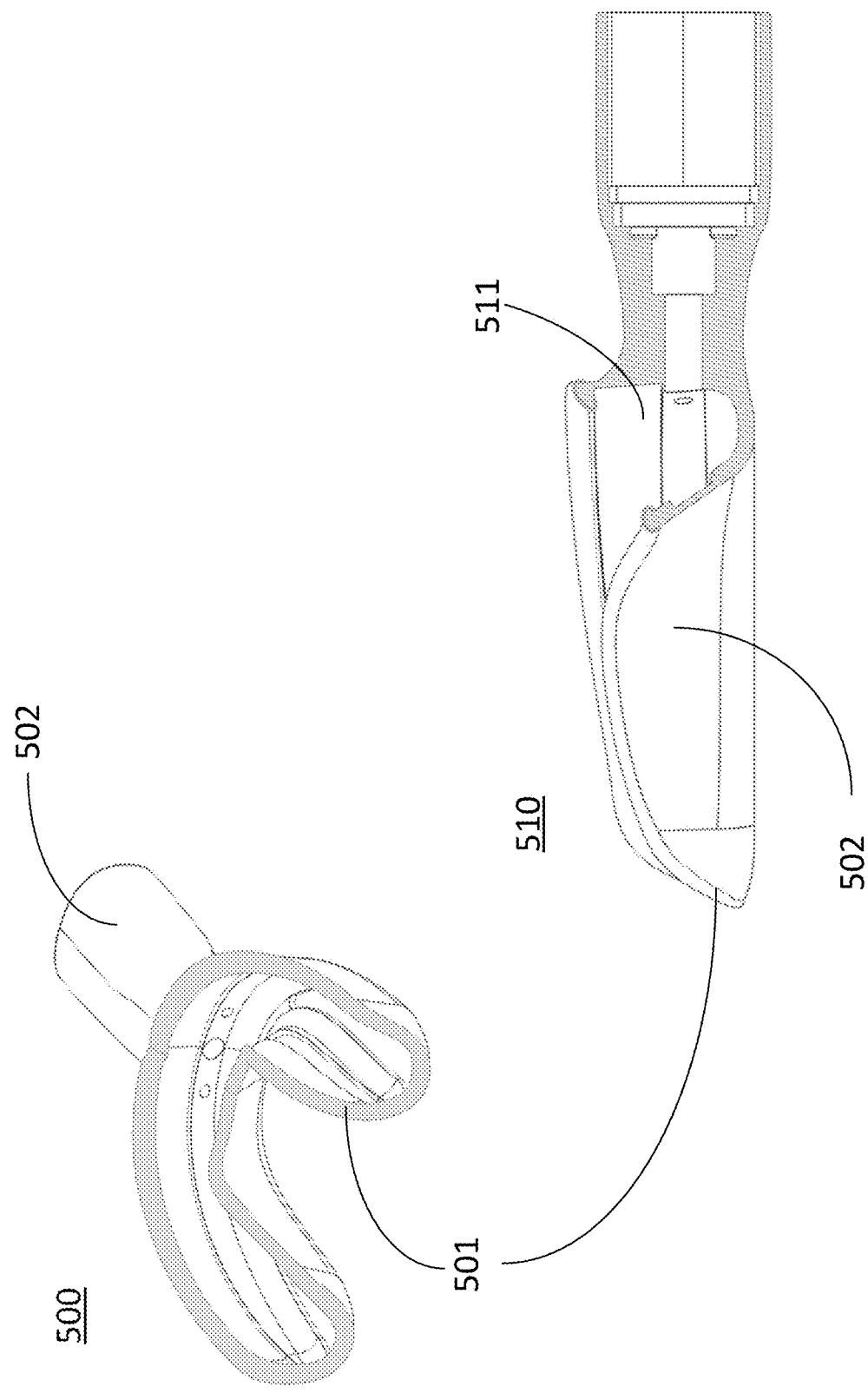
FIG. 5 illustrates a perspective and cross-sectional view of an oral care mouthpiece with a bumper having a separate composition in accordance with specific embodiments of the present invention.

FIG. 5 illustrates a perspective 500 and cross-sectional 510 view of an oral care mouthpiece 502 with a bumper 501 having a separate composition in accordance with specific embodiments of the present invention. As illustrated, the bumper 501 is formed on an edge of the oral care mouthpiece 502. Bumper 501 is formed on the seal limit between the gingiva and mouthpiece owing to the fact that the seal limit will necessarily be in contact with the dental arch and cause discomfort if the material is too hard and the mouthpiece causes an oral care action by contracting and de-contracting. In the illustrated case, the membrane 511 can be formed of moulded soft plastic, rubber, silicon, or other elastic material. In specific embodiments of the invention, the membrane can be an elastic base shaped to the dental arch. The bumper can be formed by moulding or by an adhesion or other bonding process.

In specific embodiments of the invention, the oral care mouthpiece can include a set of rigid elements. The rigid elements can be connected to or embedded within a flexible membrane. The flexible membrane can have the characteristics of the flexible membrane described above. The rigid elements can be formed on or in the base. The rigid elements can be attached to the mouthpiece using glue or over-moulding. For example, the rigid elements can be held in place by a mould while the flexible membrane is formed around them. The flexible membrane can be an over-moulded structure surrounding the set of rigid elements. The flexible membrane could be formed by a soft material such as silicon or TPE. The rigid elements can be independent and spaced apart such that they do not limit the deformation of the mouthpiece. In specific embodiments of the invention, the rigid elements are short and independent rods that do not overly limit the mouthpiece deformation. In specific embodiments of the invention, the contraction amplitude of the oral care mouthpiece could be increased by the addition of rigid elements as contact with the curvature of the dental arch by one portion of the element could lever an alternative portion of the rigid element away from the dental arch. In specific embodiments of the invention, the contraction amplitude of the oral care mouthpiece could be increased by the addition of magnetic rigid elements arranged with alternating polarities to force the independent rigid elements in alternating directions. In specific embodiments of the invention, the contraction amplitude of the oral care mouthpiece could be increased through the use of links between the rigid elements. For example, the links could be small springs or be magnetic and arranged to force the independent rigid elements to move in alternating directions.

Flow chart 200 in FIG. 2 can include a step 230 of over-moulding a set of rigid elements. The step of over-moulding can involve forming the base of the oral care mouthpiece around the rigid elements. The over-moulding can cause the flexible membrane to be an over-moulded structure surrounding the set of rigid elements. The rigid elements can be held in place temporarily by the mould during a first injection moulding process and then be entirely sealed within the membrane during a second moulding process.

In specific embodiments of the invention, the oral care elements are formed on a flat flexible skeleton. Those approaches offer certain benefits when applied to embodiments in which the oral care elements are moulded because the demoulding axis of the oral care elements can be kept much higher and regularized than for the formation of oral care elements on the curved portions of an oral care mouthpiece which is shaped to a dental arch. The flexible skeleton can include oral care elements attached to the skeleton through over-moulding, or from being part of the same mould. The oral care elements can also be attached to the flat skeleton using an adhesive, heat treatment, sonic welding, or any of the methods mentioned herein. A flat skeleton can, in certain embodiments, present certain benefits in that the demoulding axis will be aligned with the oral care elements formed thereon, allowing for finer dimensions and an improved oral care action in the finished product.

Figure 6:
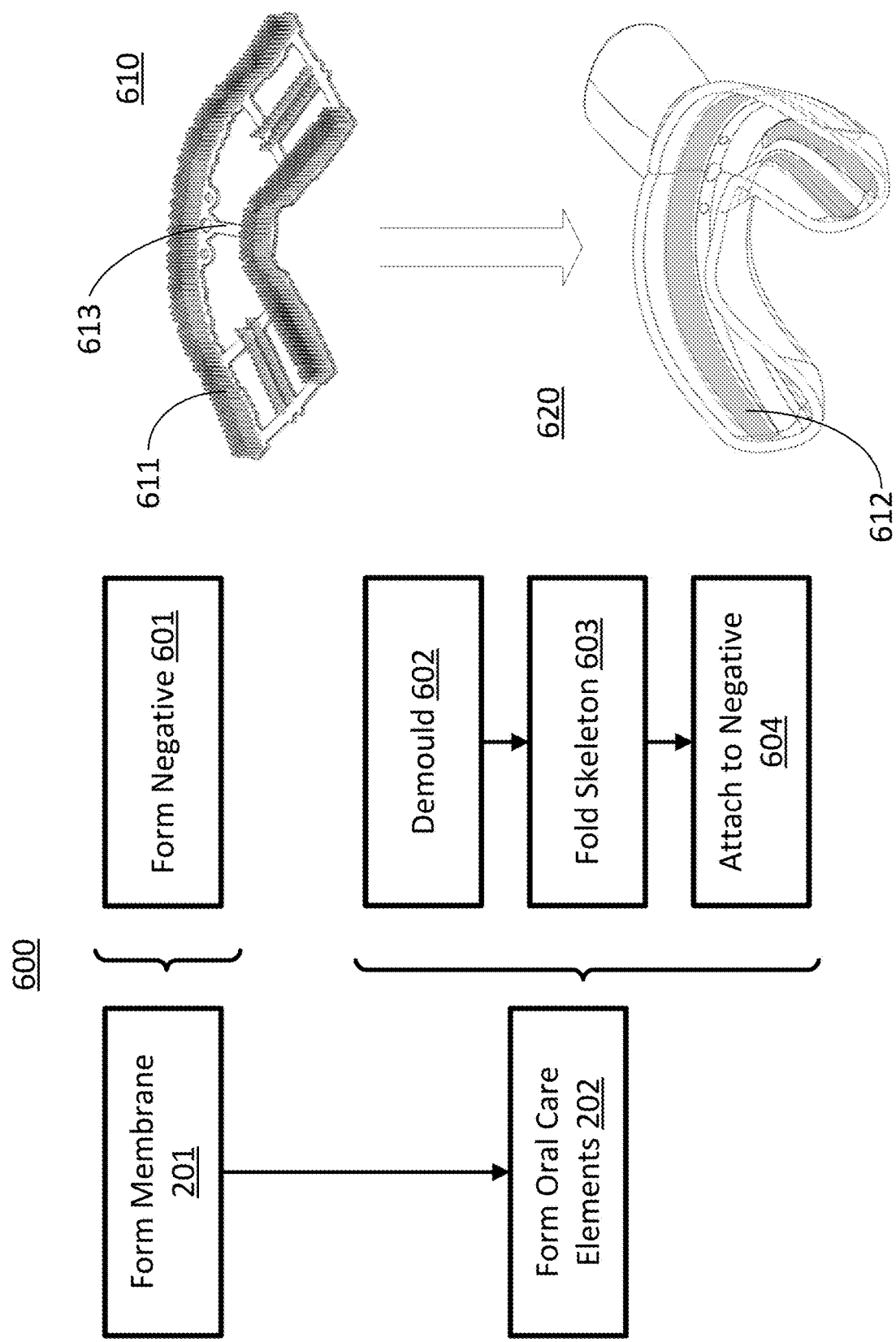
FIG. 6 illustrates a set of oral care elements on a flexible skeleton being attached to an oral care mouthpiece and a flow chart for a set of methods for forming an oral care mouthpiece that are in accordance with specific embodiments of the present invention.

FIG. 6 illustrates a set of oral care elements 611 on a flexible skeleton 610 being attached to an oral care mouthpiece 620 and a flow chart 600 for a set of methods for forming an oral care mouthpiece that are in accordance with specific embodiments of the present invention. In the illustrated case, the flat skeleton 610 is attached to the oral care mouthpiece 620 using a negative 612 formed in the oral care mouthpiece. The attachment can be via adhesives, welding such as sonic welding, fusing, or any method for bonding or otherwise attaching two components.

The flexible skeleton 610 includes a set of oral care elements in the form of bristles 611 moulded with the skeleton. In specific embodiments of the invention, to simplify handling and fabrication, the skeleton can include bridges to join separate segments. As illustrated, flexible skeleton 610, includes bridges 613 between the different regions of the skeleton which maintain skeleton 610 as a single piece but does not limit the deformation of the mouthpiece when the skeleton is attached to the base. The bridges can be of a thinner material than the remainder of the skeleton and, in embodiments in which the mouthpiece includes a negative to receive the skeleton, the negative does not necessarily include regions to receive the bridges.

Flow chart 600 begins with an implementation of step 201 from FIG. 2 which includes a step 601 of forming a negative in the flexible membrane. The negative can be negative 612 in oral care mouthpiece 620. The negative can be a negative of the flexible skeleton that will be bonded to the oral care mouthpiece. The step is optional in that specific embodiments of the flat skeleton can alternatively be bonded to a featureless portion of an oral care mouthpiece.

Flow chart 600 continues with an implementation of step 202 in the form of step 602 in which the skeleton is demoulded. As the skeleton is flat, the oral care elements can be fabricated with small cross sections and the process avoids the limitations of manufacturing for complex three-dimensional geometries. Furthermore, as mentioned above, the density of the oral care elements can be kept relatively high as compared to when the demoulding axis is not properly aligned given the geometry of the oral care elements. Step 602 can be preceded by moulding a flat skeleton which includes the set of oral care elements. The mould can be drilled with high accuracy, thinness, and ease of demoulding since it is a flat part. The flat skeleton also decreases the likelihood that oral care elements will be torn during demoulding.

Flow chart 600 continues with step 603 in which the skeleton is folded, and step 604 in which the skeleton is attached to the mouthpiece. Step 604 can include attaching the flat skeleton, such as flat skeleton 610, to the flexible membrane using the negative, such as negative 612 in mouthpiece 620. This process is illustrated by the arrow connecting flat skeleton 610 and base 620. The illustrated approach uses a negative 612. However, a negative is not required and the skeleton can instead be attached at a targeted location directly onto a surface of a base. The skeleton and base can be connected using any of the approaches described above for connecting a set of oral care elements to a mouthpiece base. For example, the skeleton can be connected using sonic welding, fusing, gluing, stapling, or sewing.

Although the invention has been described with regard to its embodiments, specific embodiments and various examples, it should be understood that various changes and modifications as would be obvious to one having ordinary skill in this art may be made without departing from the scope of the invention as set forth in the claims appended hereto.

What is claimed is:

1. An oral care mouthpiece comprising:
 a flexible membrane;
 a set of oral care elements: (i) attached to the flexible membrane; and (ii) having an oral care element composition;
 wherein each oral care element in the set of oral care elements has a minimum stiffness value higher than $4 \times 10^{-8}$ Nm and lower than $6 \times 10^{-3}$ Nm;
 wherein the oral care element composition has a hardness of at least 50 shA;
 wherein the flexible membrane has a flexible membrane composition; and
 wherein the oral care element composition is a core of the flexible membrane composition and a surface layer of abrasive particles.

2. The oral care mouthpiece of claim 1, wherein:
 the surface layer of abrasive particles is irregular and includes a set of gaps; and
 the gaps in the set of gaps are all smaller than one milli-meter.

3. An oral care mouthpiece comprising:
 a flexible membrane;

a set of oral care elements: (i) attached to the flexible membrane; and (ii) having an oral care element composition; and wherein:

each oral care element in the set of oral care elements has a minimum stiffness value higher than $4\times10^{-8}$ Nm and lower than $6\times10^{-3}$ Nm;

the oral care element composition has a hardness of at least 50 shA;

the flexible membrane has a flexible membrane composition;

the oral care element composition: (i) is a same type of composition as the flexible membrane composition; but (ii) has a larger hardness than the flexible membrane composition; and the oral care elements are one of: (i) an over-moulded structure formed on the flexible membrane; and (ii) a co-injected structure formed on the flexible membrane.

4. The oral care mouthpiece of claim 3, wherein:
the flexible membrane composition and the oral care element composition are both silicone.

5. The oral care mouthpiece of claim 1, wherein:
the set of oral care elements define: (i) at least one brushing plane below a dental arch; and (ii) at least two brushing planes aside the dental arch.

6. The oral care mouthpiece of claim 1, wherein:
the flexible membrane has two liquid injection orifices from the exterior of the mouthpiece to the interior of the mouthpiece; and
the flexible membrane has a drainage orifice from the interior of the mouthpiece to the exterior of the mouthpiece.

7. The oral care mouthpiece of claim 6, wherein:
the drainage orifice is centrally located along the mouthpiece; and
the liquid injection orifices bracket the drainage orifice.

8. The oral care mouthpiece of claim 1, wherein:
the flexible membrane composition has a Shore Type A hardness between 5 shA and 60 shA.

9. The oral care mouthpiece of claim 8, wherein:
the flexible membrane: (i) deforms uniformly; and (ii) seals with a dental arch.

10. The oral care mouthpiece of claim 8, wherein:
the flexible membrane composition is biocompatible.

11. The oral care mouthpiece of claim 1, wherein:
the oral care elements are longer than 3 mm and shorter than 10 mm;
the oral care elements have a minimum cross section, measured at a midpoint of the length of the oral care elements, greater than 0.1 mm; and
the oral care elements have an average cross section, measured at the midpoint of the length of the oral care elements, lower than 0.5 mm.

12. The oral care mouthpiece of claim 1, wherein:
the oral care elements have a density lower than 10 elements per square millimetre.

13. The oral care mouthpiece of claim 1, wherein:
the oral care elements have an orientation of less than 45 degrees from a demoulding axis of the oral care mouthpiece.

14. The oral care mouthpiece of claim 1, further comprising:
a bumper located on an edge of the oral care mouthpiece;
wherein the bumper is formed to contact a dental arch;
wherein the bumper has a bumper composition; and
wherein the bumper composition has a smaller hardness than the flexible membrane composition.

15. The oral care mouthpiece of claim 1, further comprising:
a set of rigid elements;
wherein the flexible membrane is an over-moulded structure surrounding the set of rigid elements; and
wherein the set of rigid elements increase a contraction or decontraction amplitude of the oral care mouthpiece.

16. A method of forming an oral care mouthpiece comprising:
forming a flexible membrane;
forming a set of oral care elements: (i) attached to the flexible membrane; and (ii) having an oral care element composition;
wherein each oral care element in the set of oral care elements has a minimum stiffness value higher than $4\times10^{-8}$ Nm and lower than $6\times10^{-3}$ Nm;
wherein the oral care element composition has a hardness of at least 50 shA; and
wherein forming the set of oral care elements further comprises:
moulding the set of oral care elements with the flexible membrane using a flexible membrane composition; and
pulverizing a surface of the set of oral care elements using a mixed solution.

17. The method of claim 16, wherein:
the mixed solution includes abrasive particles in diluted silicone.

18. The method of claim 16, wherein:
the mixed solution forms an outer layer of abrasive particles on the oral care elements;
the layer of abrasive particles is irregular and includes a set of gaps; and
the gaps in the set of gaps are all smaller than one milli-meter.

19. The method of claim 16, wherein forming the flexible membrane includes:
forming two liquid injection orifices from the exterior of the mouthpiece to the interior of the mouthpiece; and
forming a drainage orifice from the interior of the mouthpiece to the exterior of the mouthpiece.

20. The method of claim 16, further comprising:
forming a bumper on an edge of the oral care mouthpiece;
wherein the bumper is formed to contact a dental arch;
wherein the bumper has a bumper composition; and
wherein the bumper composition has a lower hardness than the flexible membrane composition.

21. The method of claim 16, wherein forming the flexible membrane further comprises:
over-moulding a set of rigid elements; and
wherein the over-moulding causes the flexible membrane to be an over-moulded structure surrounding the set of rigid elements.

22. An oral care mouthpiece comprising:
a flexible membrane;
a set of oral care elements: (i) attached to the flexible membrane; and (ii) having an oral care element composition;
wherein an oral care element in the set of oral care elements has a stiffness value higher than $4\times10^{-8}$ Nm and lower than $6\times10^{-3}$ Nm;
wherein the stiffness value is measured from an axis perpendicular to a minimum cross section of the oral care element;
wherein the oral care element composition has a hardness of at least 50 shA;
wherein the flexible membrane has a flexible membrane composition;

wherein the oral care element composition: (i) is a same type of composition as the flexible membrane composition; but (ii) has a larger hardness than the flexible membrane composition; and wherein the oral care elements are one of: (i) an over-moulded structure formed on the flexible membrane; and (ii) a co-injected structure formed on the flexible membrane.

23. The oral care mouthpiece of claim 3, wherein:
the flexible membrane composition and the oral care element composition are both thermo-plastic elastomers with styrenic block copolymers.

24. The oral care mouthpiece of claim 3, wherein:
the set of oral care elements define: (i) at least one brushing plane below a dental arch; and (ii) at least two brushing planes aside the dental arch.

25. The oral care mouthpiece of claim 3, wherein:
the flexible membrane has two liquid injection orifices from the exterior of the mouthpiece to the interior of the mouthpiece; and
the flexible membrane has a drainage orifice from the interior of the mouthpiece to the exterior of the mouthpiece.

26. The oral care mouthpiece of claim 25, wherein:
the drainage orifice is centrally located along the mouthpiece; and
the liquid injection orifices bracket the drainage orifice.

27. The oral care mouthpiece of claim 3, wherein:
the flexible membrane composition has a Shore Type A hardness between 5 shA and 60 shA.

28. The oral care mouthpiece of claim 27, wherein:
the flexible membrane: (i) deforms uniformly; and (ii) seals with a dental arch.

29. The oral care mouthpiece of claim 27, wherein:
the flexible membrane composition is biocompatible.

30. The oral care mouthpiece of claim 3, wherein:
the oral care elements are longer than 3 mm and shorter than 10 mm;
the oral care elements have a minimum cross section, measured at a midpoint of the length of the oral care elements, greater than 0.1 mm; and
the oral care elements have an average cross section, measured at the midpoint of the length of the oral care elements, lower than 0.5 mm.

31. The oral care mouthpiece of claim 3, wherein:
the oral care elements have a density lower than 10 elements per square millimetre.

32. The oral care mouthpiece of claim 3, wherein:
the oral care elements have an orientation of less than 45 degrees from a demoulding axis of the oral care mouthpiece.

33. The oral care mouthpiece of claim 3, further comprising:
a bumper located on an edge of the oral care mouthpiece;
wherein the bumper is formed to contact a dental arch;
wherein the bumper has a bumper composition; and
wherein the bumper composition has a smaller hardness than the flexible membrane composition.

34. The oral care mouthpiece of claim 30, further comprising:
a set of rigid elements;
wherein the flexible membrane is an over-moulded structure surrounding the set of rigid elements; and
wherein the set of rigid elements increase a contraction or decontraction amplitude of the oral care mouthpiece.

35. An oral care mouthpiece comprising:
a flexible membrane;
a set of oral care elements: (i) attached to the flexible membrane; and (ii) having an oral care element composition;
a set of rigid elements;
wherein each oral care element in the set of oral care elements has a minimum stiffness value higher than $4\times10^{-8}$ Nm and lower than $6\times10^{-3}$ Nm;
wherein the oral care element composition has a hardness of at least 50 shA;
wherein the flexible membrane is an over-moulded structure surrounding the set of rigid elements; and
wherein the set of rigid elements increase a contraction or decontraction amplitude of the oral care mouthpiece.

36. A method of forming an oral care mouthpiece comprising:
forming a flexible membrane;
forming a set of oral care elements: (i) attached to the flexible membrane; and (ii) having an oral care element composition;
wherein each oral care element in the set of oral care elements has a minimum stiffness value higher than $4\times10^{-8}$ Nm and lower than $6\times10^{-3}$ Nm;
wherein the oral care element composition has a hardness of at least 50 shA;
wherein forming the set of oral care elements further comprises:
over-moulding the oral care elements on the flexible membrane;
wherein the flexible membrane has a flexible membrane composition; and
wherein the oral care element composition: (i) is a same type of composition as the flexible membrane composition; but (ii) has a larger hardness than the flexible membrane composition.

37. The method of claim 36, wherein:
the flexible membrane composition and the oral care element composition are both thermo-plastic elastomers with styrenic block copolymers.

38. The method of claim 36, wherein forming the flexible membrane includes:
forming two liquid injection orifices from the exterior of the mouthpiece to the interior of the mouthpiece; and
forming a drainage orifice from the interior of the mouthpiece to the exterior of the mouthpiece.

39. The method of claim 36, further comprising:
forming a bumper on an edge of the oral care mouthpiece;
wherein the bumper is formed to contact a dental arch;
wherein the bumper has a bumper composition; and
wherein the bumper composition has a lower hardness than the flexible membrane composition.

40. A method of forming an oral care mouthpiece comprising:
forming a flexible membrane;
forming a set of oral care elements: (i) attached to the flexible membrane; and (ii) having an oral care element composition;
wherein each oral care element in the set of oral care elements has a minimum stiffness value higher than $4\times10^{-8}$ Nm and lower than $6\times10^{-3}$ Nm;
wherein the oral care element composition has a hardness of at least 50 shA;
wherein forming the set of oral care elements further comprises:
co-injecting the oral care elements and the flexible membrane;
wherein the flexible membrane has a flexible membrane composition; and wherein the oral care element composition: (i) is a same type of composition as the flexible membrane composition; but (ii) has a larger hardness than the flexible membrane composition.

41. The method of claim 40, wherein:

the flexible membrane composition and the oral care element composition are both thermo-plastic elastomers with styrenic block copolymers.

42. The method of claim 40, wherein forming the flexible membrane includes:

forming two liquid injection orifices from the exterior of the mouthpiece to the interior of the mouthpiece; and forming a drainage orifice from the interior of the mouthpiece to the exterior of the mouthpiece.

43. The method of claim 40, further comprising:

forming a bumper on an edge of the oral care mouthpiece;

wherein the bumper is formed to contact a dental arch;

wherein the bumper has a bumper composition; and wherein the bumper composition has a lower hardness than the flexible membrane composition.

44. A method of forming an oral care mouthpiece comprising:

forming a flexible membrane;

forming a set of oral care elements: (i) attached to the flexible membrane; and (ii) having an oral care element composition;

wherein each oral care element in the set of oral care elements has a minimum stiffness value higher than $4 \times 10^{-8}$ Nm and lower than $6 \times 10^{-3}$ Nm;

wherein the oral care element composition has a hardness of at least 50 shA;

forming a negative in the flexible membrane;

wherein forming the set of oral care elements further comprises:

moulding a flat skeleton which includes the set of oral care elements;

folding the flat skeleton; and attaching the flat skeleton to the flexible membrane using the negative.

45. The method of claim 44, wherein forming the flexible membrane includes:

forming two liquid injection orifices from the exterior of the mouthpiece to the interior of the mouthpiece; and forming a drainage orifice from the interior of the mouthpiece to the exterior of the mouthpiece.

46. The method of claim 44, further comprising:

forming a bumper on an edge of the oral care mouthpiece;

wherein the bumper is formed to contact a dental arch;

wherein the bumper has a bumper composition;

wherein the flexible membrane has a flexible membrane composition; and wherein the bumper composition has a lower hardness than the flexible membrane composition.

* * * * *

UNITED STATES PATENT AND TRADEMARK OFFICE
CERTIFICATE OF CORRECTION

| | | |
|---|---|---|
| PATENT NO. | : 10,905,534 B1 | Page 1 of 1 |
| APPLICATION NO. | : 16/748550 | |
| DATED | : February 2, 2021 | |
| INVENTOR(S) | : Bodin et al. | |

It is certified that error appears in the above-identified patent and that said Letters Patent is hereby corrected as shown below:

In the Claims

Column 17, Claim 34, Line 59 please delete "claim 30" and insert --claim 3--.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*